United States Patent [19]
Chou

[11] Patent Number: 6,154,759
[45] Date of Patent: Nov. 28, 2000

[54] VISITING CARD COMPUTER SYSTEM

[76] Inventor: Cheng-Haw Chou, 2F, No. 7, Lane 17, Sec. 4, PA TE Road, Taipei, Taiwan

[21] Appl. No.: 09/113,361

[22] Filed: Jul. 10, 1998

[51] Int. Cl.[7] ....................................................... G06F 1/16
[52] U.S. Cl. ............................................ 708/110; 361/683
[58] Field of Search ............................ 708/110; 361/683, 361/686

[56] References Cited

U.S. PATENT DOCUMENTS

| | | | |
|---|---|---|---|
| 4,209,735 | 6/1980 | Yoshida | 320/2 |
| 5,068,787 | 11/1991 | Pipella et al. | 708/110 |
| 5,587,724 | 12/1996 | Matsuda | 708/110 |
| 5,675,524 | 10/1997 | Bernard | 361/683 |
| 5,710,728 | 1/1998 | Danielson et al. | 361/683 |
| 5,867,406 | 2/1999 | Yanagisawa | 361/683 |

*Primary Examiner*—David H. Malzahn
*Attorney, Agent, or Firm*—Bacon & Thomas, PLLC

[57] ABSTRACT

A visiting card-sized computer includes a wallet-like carrying case, a computer body, and a keyboard. The computer body and keyboard are on different foldable sections of the case, connection of the keyboard to the computer is by a ribbon cable extending between the foldable sections, and an input/output port for a second cable connecting the visiting card computer with another computer is situated on the keyboard. The second cable may include an RS-232 connector, a converter, and a DB25 connector. In addition, connection between the ribbon cable and the computer body is via a PCMCIA interface connector, permitting the computer body to be plugged directly into a notebook computer upon removal from the carrying case.

6 Claims, 3 Drawing Sheets

VISITING CARD COMPUTER SYSTEM

BACKGROUND OF THE INVENTION

1. Field of the Invention

The invention relates to a Visiting Card Computer (VCC for short) System. It is composed of a mini computer whose size is close to that of a visiting card. Together with its peripherals, the system includes: a VCC body, a VCC wallet, a mini input keyboard, and a computer data input/output cord, etc.

2. Description of Related Art

Since the personal computer (desktop type) has been popular for many years, computer manufacturers have been investing innumerable funds to minimize the computer, making it much more portable and easier to operate. As we have seen, the computer has been going through its miniaturization as follows: early portable computer (about 4 kg. or over), notebook computer (about 1.5~3.9 kg.), sub-notebook computer (about 1.4~1.5 kg.), hand computer (about 0.5~1.0 kg.), and now, visiting card computer (less than 100 gm.). This shows that the trend is to make the computer much lighter, shorter, smaller and easier to carry and operate with each passing day.

Although all kinds of computers can coexist on today's market without substitution for each other, the tendency of being much lighter, thinner and shorter must be irresistible. Accordingly, the VCC, with its unique style (it can be put into your pocket, having simple keys and screen), has been gradually becoming a hot point on the market. Because it can provide the functions of making a personal memo, timing, travel planning, data recording, inquiring and management, the VCC must be well accepted by all busy business persons in modern society. The PDA products like the hand computer and pocket computer and electronic visiting card which are now available on the market are either as cumbersome as an electronic dictionary or pretty poor in functions because only simple input and searching functions are available.

Current problems with one above mentioned PDA products are: a complete keyboard is needed for effective input function (the pen inputting method is too limited). Consequently, the volume and weight cannot be reduced (e.g. hand type and pocket type). If you want to make it lighter, thinner, shorter and smaller (e.g., visiting card type), the functions will be insufficient and the operation will be inconvenient. For this reason, the creator determined to develop a visiting-card-sized computer with enhanced operation functions. After a series of relevant planning, research and design, the invention (VCC system) has been finally completed.

SUMMARY OF THE INVENTION

The main purpose of this invention is to provide a VCC system, including a VCC body with a screen, several switching keys and shift keys, a book wrapper-like VCC wallet used to hold the VCC body and a mini input keyboard which are connected to each other through terminals and a flat cable and a computer data input/output cord for exchanging data between VCC and other computers. It has the following operating functions: using the VCC body independently, or combining it with the VCC wallet and mini input keyboard, or connecting the whole system with another computer through the computer data input/output cord.

The invention provides a computer as small as a visiting card. It can be used as a personal planning calendar or telephone directory, memo, clock, calculator and code table, etc. There is a screen and several switching keys and shift keys on the VCC body. For holding the VCC body and mini input keyboard on each of the two inner faces of the VCC wallet, two inlaid slots are made on each of the faces. The VCC body and the mini keyboard are inserted into the slots respectively and are connected to each other by terminals and a flat cable. The VCC can be connected with a desktop computer through its port and the computer input/output cord to exchange data. The system has a variety of operation options as follows: The user can use the VCC body independently, or use it together with the VCC wallet and mini input keyboard, or connect the VCC with another computer through the computer data input/output cord. This system has the following advantages: it is easy to carry and operate and has high selectivity and excellent compatible performance.

DETAILED DESCRIPTION OF THE PREFERRED EMBODIMENTS

Figure 1:
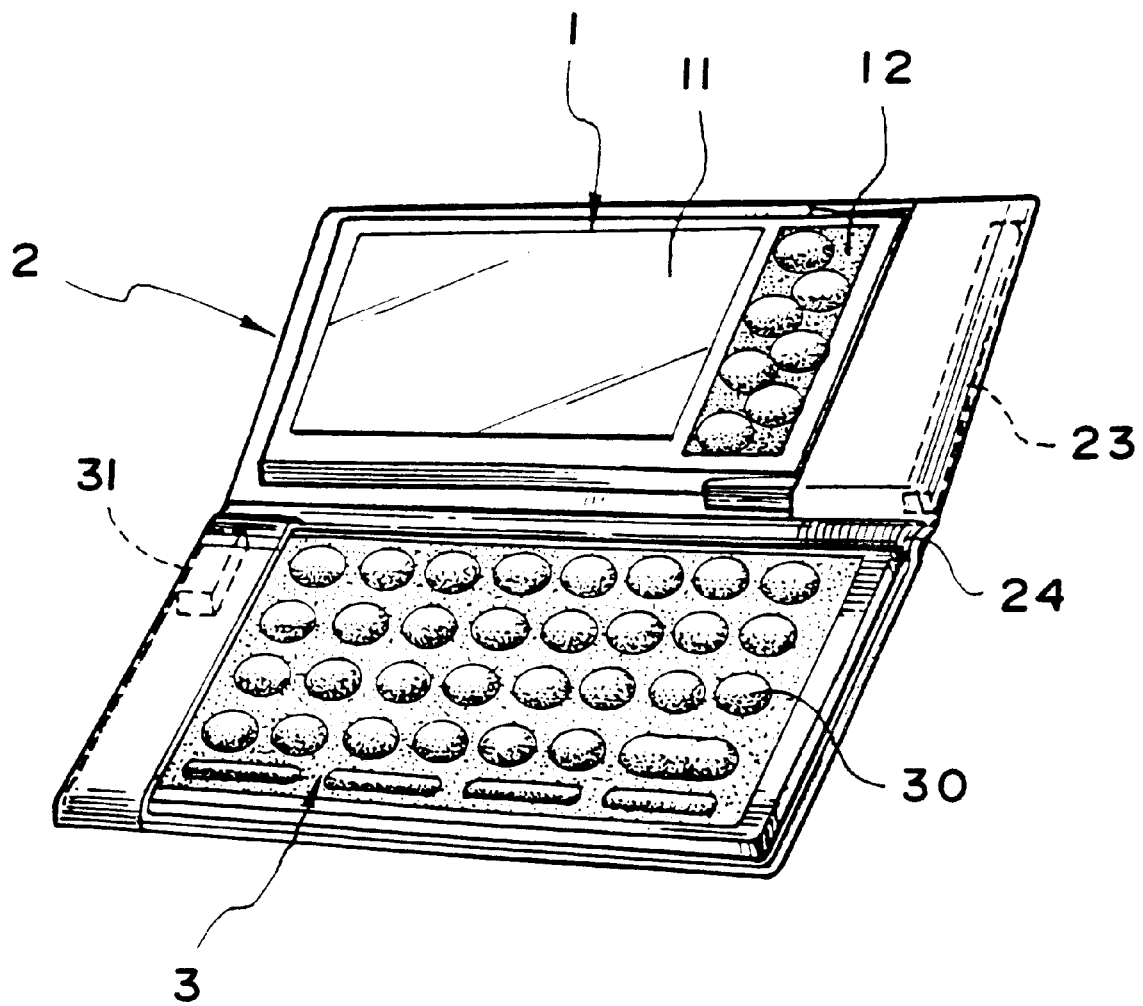
FIG. 1 is an isometric view of the preferred computing system.
Figure 2:
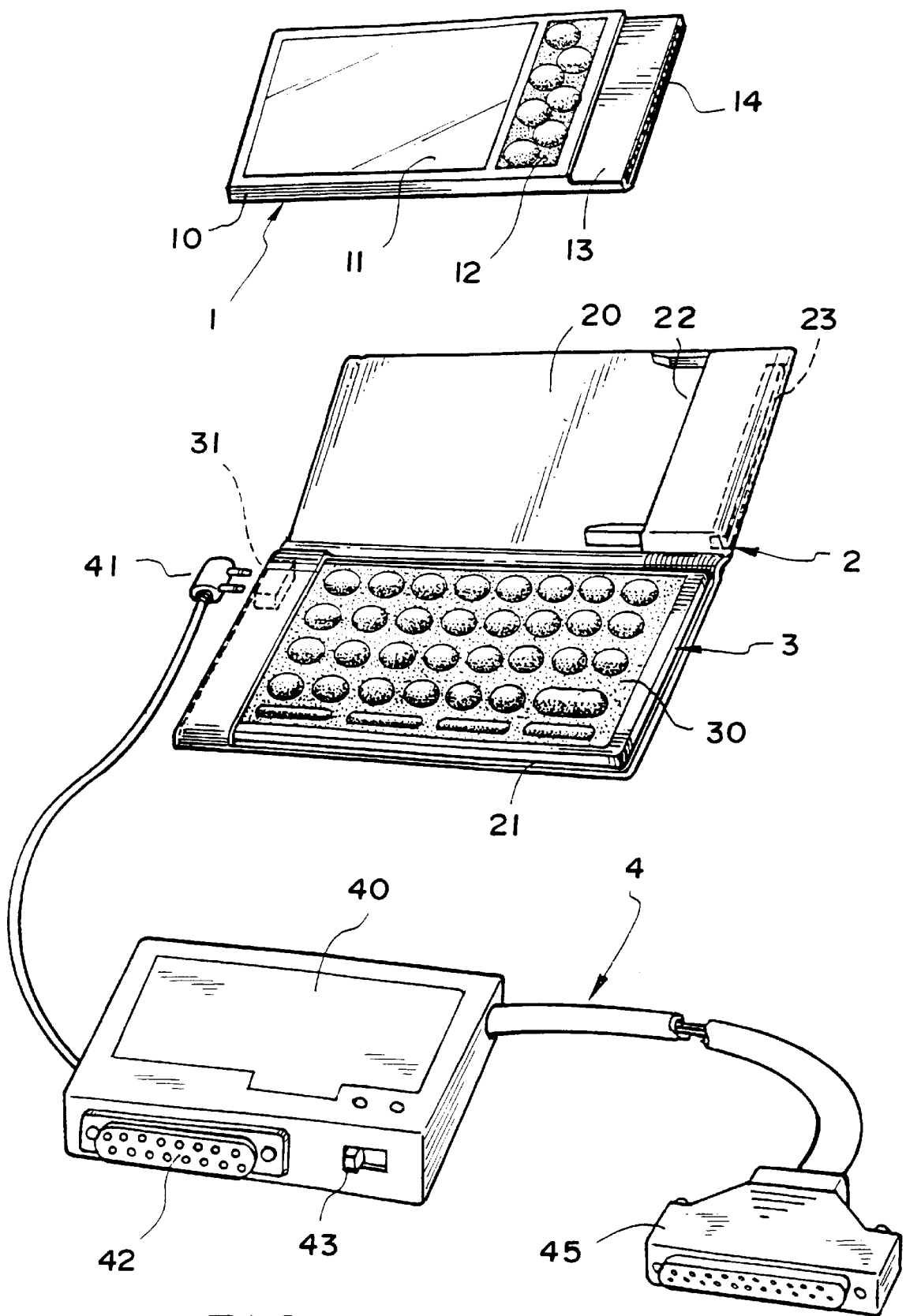
FIG. 2 is also an isometric view of the preferred computing system.

The preferred embodiment illustrated in FIGS. 1–3 includes the following elements, described in more detail below:

1—VCC body
2—VCC wallet
3—Mini input keyboard
4—Computer data input/output cord
10—Case
11—Screen
12—Searching keyboard
14—Lower step
20—Placing platform for VCC
21—Placing platform for keyboard
22—Holding pocket
23—Connection slot
24—Flat Cable
30—Film keys
31—RS232 socket
40—Converter
41—RS232 plug
42—Data set slot
43—Switch
44—Battery holder
45—DB25 connector The size of the VCC system shown in FIG. 1 and FIG. 2 is close to a visiting card. Combined with a wallet, it can be used as an ordinary portable personal planing calendar or telephone directory, memo, clock, calculator and code table, etc. It can also be used in connection with another computer. The whole system is composed of a VCC body 1 and wallet 2, mini input keyboard 3 and input/output cord 4.

The VCC body 1 has an extremely thin case 10 with an inlaid screen 11 on its surface. A searching keyboard 12 is on one side of the screen 11. The case 10 has a step 13 a little lower than the searching keyboard 12 beside the searching keyboard 12, and a connection plug 14 is arranged on the end face of the step 13.

The VCC wallet 2 is used to hold and protect the VCC body 1 and the mini input/output keyboard 3. It is composed of two folding leather pieces. One of the leather pieces' inner face serves as a VCC placing platform 20m and the other serves as a keyboard placing platform 21. A holding pocket 22 is placed at the end of the VCC placing platform 20. The lower step 13 of the VCC body 1 is inserted into the pocket, leaving the screen 11 and searching keyboard 12 exposed on the surface. A connection slot 23 is placed at the bottom of the pocket 22. The mini input keyboard 3 is fixed on the keyboard placing platform 21. The flat cable 24 is arranged in the folding part of the VCC wallet 2 to connect the slot 23 and the mini input keyboard 3.

The mini input keyboard 3 with film keys 30 on its surface is fixed on the keyboard placing platform 21. The upper end of the keyboard is connected to the slot 23 through the flat cable 24, and a RS232 socket 31 is placed beside the keyboard.

The computer data input/output cord 4 has two ends: one is an RS232 plug 41, connecting to the RS232 socket 31; and the other is a DB25 connector 43, connecting to the COM-2 (or COM-1) communication port of a PC. A converter 40 is placed between them. It has a data set slot 42 and a switch 45; and a battery holder 44 is placed at its bottom. Batteries are used to supply energy to the converter 40 (e.g. indicators etc.).

Figure 3:
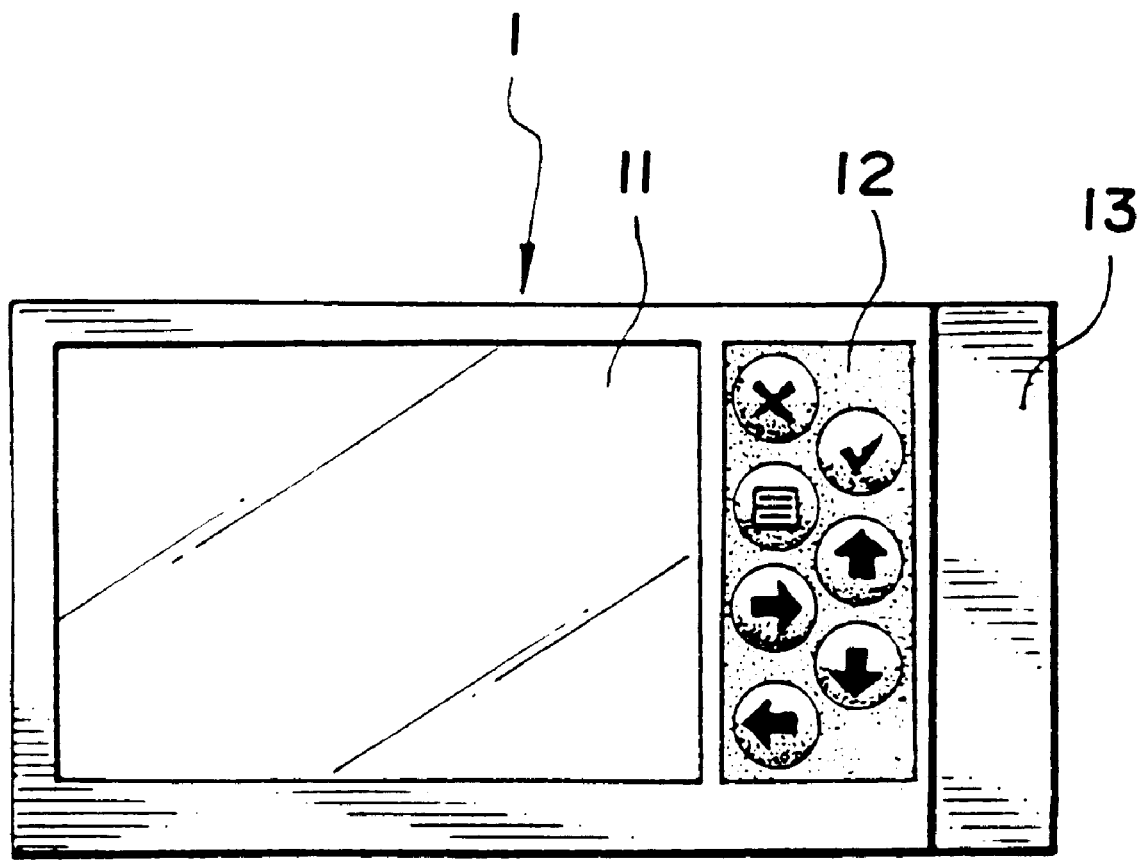
FIG. 3 is a plan view of the VCC body of the unit.

As shown in FIG. 3, the screen 11 of the VCC body 1 of this invention is used to display all kinds of personal data, e.g., a planning calendar, telephone directory, memo, clock, calculator and code table, etc. The searching keyboard 12 (beside the screen) has "Up", "Down", "Left", "Right", "ESC", "Menu", "OK" and "ENTER" keys. It can be easily operated to perform all searching functions such as "Select", "Page Up/Down", "Jump In", "Jump Out", "Input" and "Edit", etc.

The user can use a mini input keyboard 3 with 56 film-key 30 and connect the keyboard to the plug 14 of the VCC body 1 through the flat cable 24 and connection slot 23 to change the data.

Besides, through the computer data input/output cord 4, the information can be exchanged between the VCC and other computer. When the DB25 connector 43 is connected to a PC's Com-2 port, data stored in the commonly used software MS Outlook 97; Outlook 98, or Lotus Organizer 97GS can be exchanged between the VCC and PC by using special Windows software CoolSync which can convert data synchronously. The switch 45 is used to select either the VCC body 1 or PC. Because the user can easily create or change data by utilizing the features of the other computer (such as larger keyboard and screen), the data in VCC can be easily changed through the computer input/output cord 4. Accordingly, the personal data established in the VCC will be the same data as in the ordinary computer but easier to carry and search.

From the above illustration, this invention provides a kind of VCC system. It mainly includes a visiting card computer body 1 with a screen 11 and several switching and shifting keys, a book wrapper-like VCC wallet 2 which is used to hold a mini input keyboard 3 and the visiting card computer body 1. A plug and a flat cable 24 are used to connect the computer body and the keyboard, and a computer data input/output cord 4 is used to exchange data between the visiting card computer and other computer. Its functions are:
(1) Searching data by using the VCC body 1 independently;
(2) Inputting data by joining the VCC body 1 with its wallet 2 and mini input keyboard 3: (3) The system can be connected to other computer through a computer data input/output cord 4 to perform data exchange between them. In addition, the user may insert the visiting card computer into a notebook computer's PIMCIA Type2 or Type3 slot through a 68-pin plug interface connection to perform data exchange.

In summary, this creation is indeed an excellent VCC system, it is convenient in operation, high in selectivity and good in compatibility. It is not only novel and modern, but also practical.

What is claimed is:

1. A visiting card computer system having a size approximately equal to that of a visiting card, comprising:

a computer housed within a computer body;

a carrying case; and a miniature input keyboard;

wherein the computer body has an inlaid screen on a surface of the case, an auxiliary searching keyboard adjacent the screen, and a stepped portion, and wherein a row of connection plugs is located at an end of the stepped portion, wherein the carrying case is a wallet arranged to hold the computer body and the input keyboard, said wallet comprising first and second pieces connecting by a flexible portion to form a folding wallet, said first piece providing a platform for said computer body and said second piece providing a platform for the input keyboard, said first piece including a pocket into which the stepped portion of the computer body is inserted so that the screen and searching keyboard are exposed and supported by the platform, said pocket including a connection slot at one end, said connection slot arranged to receive said row of connection plugs, and a first cable extending from said connection slot for connecting said computer with the input keyboard, said input keyboard being fixed to the second piece; and wherein said input keyboard includes an input/output port for connection to a second cable, second cable being arranged to for connecting said keyboard, and therefore said computer, with another computer.

2. A visiting card computer system as claimed in claim 1, wherein said first and second pieces of said carrying case are made of leather.

3. A visiting card computer system as claimed in claim 1, wherein said first cable is a flat ribbon cable.

4. A visiting card computer system as claimed in claim 1, wherein said input/output port is an RS-232 interface socket, and said second cable includes an RS-232 plug connector arranged to mate with said interface socket.

5. A visiting card computer system as claimed in claim 4, wherein said second cable further includes a DB25 connecter at a second end, and a converter having a data set slot, a switch, and a battery holder arranged to supply power to the converter.

6. A visiting card computer system as claimed in claim 1, wherein said row of connection plugs comprise a PCMCIA interface plug and said connection slot is a PCMCIA interface slot, and wherein said PCMCIA interface plug permits the computer body to be directly inserted into a notebook computer's PCMCIA interface slot when said computer body is removed from said carrying case.

* * * * *